United States Patent
Ritchie et al.

(10) Patent No.: US 12,059,096 B2
(45) Date of Patent: *Aug. 13, 2024

(54) TABLE HAVING A HEATING APPLIANCE

(71) Applicant: The Cashmere Caveman Co, Wild Kitchens Limited, London (GB)

(72) Inventors: Guy Stuart Ritchie, London (GB); Nigel Bruce True, London (GB)

(73) Assignee: The Cashmere Caveman Co, Wild Kitchens Limited, London (GB)

( * ) Notice: Subject to any disclaimer, the term of this patent is extended or adjusted under 35 U.S.C. 154(b) by 350 days.

This patent is subject to a terminal disclaimer.

(21) Appl. No.: 17/511,192

(22) Filed: Oct. 26, 2021

(65) Prior Publication Data
US 2022/0113036 A1 Apr. 14, 2022

Related U.S. Application Data

(63) Continuation of application No. 17/318,380, filed on May 12, 2021, now Pat. No. 11,197,581, which is a
(Continued)

(30) Foreign Application Priority Data

Aug. 31, 2017 (GB) .................................... 1713935

(51) Int. Cl.
*A47J 37/07* (2006.01)
*A47B 31/02* (2006.01)
(Continued)

(52) U.S. Cl.
CPC ........... *A47J 37/0781* (2013.01); *A47B 31/02* (2013.01); *A47B 37/00* (2013.01); *A47B 37/04* (2013.01);
(Continued)

(58) Field of Classification Search
CPC ...... A47J 37/0781; A47B 31/02; A47B 37/04; A47B 2200/0019; F23B 30/02;
(Continued)

(56) References Cited

U.S. PATENT DOCUMENTS 3,217,634 A    11/1965   Fox
3,222,051 A * 12/1965   Bevilacqua ............ G03B 27/64
                                                                       108/50.13
(Continued)

FOREIGN PATENT DOCUMENTS

CN          105091034 A    11/2015
CN          205053277 U    3/2016
(Continued)

OTHER PUBLICATIONS

Notice of Allowance issued in U.S. Appl. No. 17/319,621, date of mailing: Nov. 12, 2021, 6 pages.
(Continued)

*Primary Examiner* — Jose V Chen
(74) *Attorney, Agent, or Firm* — Morrison & Foerster LLP

(57) ABSTRACT

A table (1) has a table top (2) containing an opening (3). A heating appliance (10) is in the opening (3) wherein the heating appliance (10) extends at least beneath the table top (2). The table top opening (3) comprises a recess (5) in which the heating appliance (10) is received, and the recess (5) has at least one wall (7) below the table top (2). The heating appliance (10) has a substantially sealed chamber (13) for receiving combustible fuel (47) with which the heating appliance (10) is used, and the chamber (13) has at least one window (35, 45).

14 Claims, 19 Drawing Sheets

Related U.S. Application Data continuation of application No. 16/604,725, filed as application No. PCT/GB2018/000117 on Aug. 31, 2018, now Pat. No. 11,051,655.

(51) Int. Cl.
  *A47B 37/00* (2006.01)
  *A47B 37/04* (2006.01)
  *F23B 30/02* (2006.01)
  *F24B 1/02* (2006.01)
  *F24B 5/02* (2006.01)
  *F24B 5/06* (2006.01)
  *F24B 13/02* (2006.01)
  *F24C 15/30* (2006.01)
  *F24C 15/04* (2006.01)

(52) U.S. Cl.
  CPC .............. *F23B 30/02* (2013.01); *F24B 1/028* (2013.01); *F24B 5/023* (2013.01); *F24B 5/06* (2013.01); *F24B 13/02* (2013.01); *F24C 15/30* (2013.01); *A47B 2200/0019* (2013.01); *F24C 15/04* (2013.01)

(58) Field of Classification Search
  CPC .. F24B 1/028; F24B 5/023; F24B 5/06; F24B 13/02; F24C 15/30; F24C 15/04
  USPC .......................................... 108/50.13, 50.11
  See application file for complete search history.

(56) References Cited

U.S. PATENT DOCUMENTS

| | | | |
|---|---|---|---|
| 3,491,744 A | 1/1970 | Von, Jr. | |
| 3,745,303 A | 7/1973 | Epperson et al. | |
| 3,972,276 A | 8/1976 | Kamra | |
| 4,282,853 A * | 8/1981 | Reynolds | A47J 37/06 126/41 E |
| 4,635,612 A | 1/1987 | Kakubari et al. | |
| 4,664,026 A | 5/1987 | Milloy | |
| 4,759,276 A | 7/1988 | Segroves | |
| 4,840,128 A | 6/1989 | McFarlane et al. | |
| 5,094,221 A | 3/1992 | Ho | |
| 5,168,796 A | 12/1992 | Porton et al. | |
| 5,183,027 A | 2/1993 | Saldana | |
| 5,421,321 A | 6/1995 | Ward | |
| 5,599,094 A | 2/1997 | Fischer et al. | |
| 5,778,800 A | 7/1998 | Liang | |
| 6,029,646 A | 2/2000 | Jackson | |
| 6,065,466 A | 5/2000 | Baykal | |
| 6,070,571 A | 6/2000 | Bradbury | |
| 6,250,210 B1 * | 6/2001 | Moreth | A47J 37/046 219/400 |
| 6,640,803 B2 | 11/2003 | Davis et al. | |
| 6,725,855 B1 * | 4/2004 | Brennan | B66F 7/0625 126/41 R |
| 7,681,493 B2 | 3/2010 | Moore | |
| 8,020,546 B1 | 9/2011 | Bourgeois et al. | |
| 8,338,756 B2 * | 12/2012 | Shei | A21B 3/00 219/520 |
| 8,511,110 B2 * | 8/2013 | Kim | F25D 11/00 62/426 |
| 9,474,414 B2 | 10/2016 | Yuen | |
| 10,041,682 B1 * | 8/2018 | Myers | F23L 9/02 |
| 10,094,574 B2 | 10/2018 | Quigley | |
| 10,206,537 B1 | 2/2019 | Ebbes | |
| 10,575,680 B2 | 3/2020 | Fagg et al. | |
| 11,015,818 B1 | 5/2021 | Ritchie et al. | |
| 11,051,655 B2 * | 7/2021 | Ritchie | F24B 1/006 |
| 11,197,581 B2 * | 12/2021 | Ritchie | F24B 5/023 |
| D969,530 S * | 11/2022 | Parent | D7/334 |
| 2002/0043259 A1 * | 4/2002 | Brennan | A47J 37/0781 126/41 R |
| 2002/0185122 A1 | 12/2002 | Bossler | |
| 2004/0154603 A1 | 8/2004 | Crawford et al. | |
| 2006/0096545 A1 | 5/2006 | Cone et al. | |
| 2007/0240583 A1 | 10/2007 | Lee | |
| 2008/0178745 A1 | 7/2008 | Hong | |
| 2013/0255659 A1 | 10/2013 | Fulp et al. | |
| 2014/0174427 A1 | 6/2014 | Yuen | |
| 2015/0013664 A1 | 1/2015 | Riel | |
| 2015/0308692 A1 | 10/2015 | Hurt | |
| 2017/0020335 A1 * | 1/2017 | Chen | A47J 37/0745 |
| 2020/0178729 A1 | 6/2020 | Ritchie et al. | |
| 2021/0177202 A1 | 6/2021 | True et al. | |
| 2021/0177204 A1 | 6/2021 | True et al. | |

FOREIGN PATENT DOCUMENTS

| | | | |
|---|---|---|---|
| CN | 205410943 U | 8/2016 | |
| DE | 202013006604 U1 | 8/2013 | |
| DE | 202014004428 U1 | 6/2014 | |
| DE | 202014008980 U1 | 6/2015 | |
| DE | 202020103668 U1 | 8/2020 | |
| EP | 2666385 A1 | 11/2013 | |
| FR | 1570591 A | 6/1969 | |
| FR | 2288504 A1 | 5/1976 | |
| FR | 2903291 A1 | 1/2008 | |
| FR | 2953389 A1 | 6/2011 | |
| GB | 2566042 A | 3/2019 | |
| GB | 2566042 A * | 3/2019 | A47B 31/02 |
| JP | S57203833 A | 12/1982 | |
| KR | 19990026343 | 7/1999 | |
| KR | 200412388 Y1 | 3/2006 | |
| KR | 200433042 Y1 | 12/2006 | |
| KR | 100755214 B1 * | 9/2007 | |
| KR | 20090088033 A | 8/2009 | |
| KR | 100950184 B1 | 3/2010 | |
| KR | 20110000388 | 1/2011 | |
| KR | 20110089386 A | 8/2011 | |
| KR | 20110120546 A | 11/2011 | |
| RU | 166809 U1 | 12/2016 | |
| WO | 96/01395 A1 | 1/1996 | |
| WO | 2017/018589 A1 | 2/2017 | |
| WO | 2019043351 A1 | 3/2019 | |

OTHER PUBLICATIONS

Australian Examination Report issued in Australian Application No. 2020286189, date of mailing: Dec. 23, 2021, 5 pages.
Australian Examination Report issued in Australian Patent Application No. 2018325428, date of mailing: Oct. 31, 2019 (4 pages).
Canadian Office Action issued in Canadian Application No. 3,060,168, date of mailing: Nov. 19, 2019 (6 pages).
Examination and Search Report issued in Application No. GB2014940. 7, date of mailing: Mar. 3, 2021 (7 pages).
Federal Service on Intellectual Property Search Report issued in Russian Application No. 2020108401, and the English translation (4 pages).
Final Rejection issued in U.S. Appl. No. 16/604,725, date of mailing: Sep. 6, 2020 (11 pages).
International Search Report and Written Opinion issued in International Application No. PCT/IB2020/001031, date of mailing: Apr. 14, 2021 (12 pages).
International Search Report issued in International Application No. PCT/GB2018/000117, date of mailing: Oct. 16, 2018 (4 pages).
Issued corresponding priority patent GB 2566042 B which issued on Sep. 4, 2019 (28 pages).
Non-Final Office Action issued in U.S. Appl. No. 16/604,725, date of mailing: Nov. 25, 2020 (10 pages).
Non-Final Office Action issued in U.S. Appl. No. 17/319,621, date of mailing: Jul. 19, 2021 (22 pages).
Non-Final Office Action issued in U.S. Appl. No. 16/711,147, date of mailing: Jul. 21, 2021, 46 pages.
Non-Final Office Action issued in U.S. Appl. No. 17/319,647, date mailing: Jul. 21, 2021, 21 pages.
Non-Final Office Action issued in U.S. Appl. No. 17/319,658, date of mailing: Jul. 21, 2021, 20 pages.

(56) References Cited

OTHER PUBLICATIONS

Notice of Allowance issued in U.S. Appl. No. 16/604,725, date of mailing: Apr. 29, 2021 (19 pages).
Notice of Allowance issued in U.S. Appl. No. 16/711,147, date of mailing: Aug. 18, 2021, 9 pages.
Notice of Allowance issued in U.S. Appl. No. 17/318,380, date of mailing: Aug. 6, 2021, 28 pages.
Notice of Allowance issued in U.S. Appl. No. 17/319,647, date of mailing: Aug. 13, 2021, 9 pages.
Notice of Allowance issued in U.S. Appl. No. 17/319,658, date of mailing: Aug. 13, 2021, 9 pages.
Response dated Sep. 5, 2018, for corresponding priority application GB 1713935.3 (1 page).
Russian Office Action issued in Russian Application No. 2020108401, date of mailing: Oct. 7, 2020, and the English translation (6 pages).
UKIPO's "Combined Search and Examination Report" dated Feb. 9, 2018, for corresponding priority application GB 1713935.3 (3 pages).
UKIPO's "Intention to Grant" dated Jun. 19, 2019, for corresponding priority application GB 1713935.3 (2 pages).
UKIPO's "Notification of Grant" dated Aug. 6, 2019, for corresponding priority application GB 1713935.3 (2 pages).
UKIPO's "Search Report" dated Feb. 8, 2018, for corresponding priority application GB 1713935.3 (2 pages).
Written Opinion for International Application No. PCT/GB2018/000117, date of mailing: Oct. 16, 2018 (6 pages).
UKIPO Search Report issued in Application No. GB2014940.7, date of mailing: Oct. 6, 2021, 2 pages.
Extended European search report issued in EP21196132.1, dated Jun. 8, 2022 (11 pages).

* cited by examiner

TABLE HAVING A HEATING APPLIANCE

The present invention relates to a table that can be used outdoors and that has a heating appliance.

Outdoor areas can be heated by outdoor gas heaters, fire pits, chemineas or outdoor electric heaters. Outdoor gas heaters are environmentally destructive as they produce high levels of carbon emissions, and are inefficient in heating outdoor areas. Flames from combusting fuel in fire pits and chemineas may be attractive to look at. However, fire pits and chemineas cause harmful particulate emissions to be produced, and they are inefficient in their use of fuel and therefore expensive to run. Also, there is no means of controlling the smoke that fire pits and chemineas produce. Furthermore, the amount of heat produced by fire pits and chemineas cannot be easily controlled.

A table for use outside has an electric heater for warming people around it but the heater in the table requires an external power supply. The power cord may be unsightly and people could trip up on it.

It is an object of the present invention to provide a table having a heating appliance wherein the heating appliance can provide an attractive effect when producing heat and wherein the heating appliance alleviates at least one of the above-mentioned problems.

According to the present invention there is provided a table having a table top containing an opening, and a heating appliance in said opening wherein said heating appliance extends at least beneath said table top, said table top opening comprising a recess in which said heating appliance is received, said recess having at least one wall below said table top, and said heating appliance having a substantially sealed chamber for receiving combustible fuel with which said heating appliance is used, said chamber having at least one window.

By the chamber being substantially sealed, this enables the fuel to be used efficiently to produce heat which radiates from the chamber.

The at least one window may allow an attractive view of flames from combusting fuel to be seen. The at least one window may comprise a pane. The at least one window may be translucent or transparent. The at least one window may comprise glass. The glass may be heat reflective.

The table can be used to produce a warm micro climate and visually pleasing ambience.

The chamber may have a chamber opening and a door for closing the chamber opening. The chamber opening may be for placing combustible fuel, such as wood or charcoal, in the chamber with which the heating appliance is used.

The heating appliance may include an air inlet for supplying air to an inside of said chamber for combusting said combustible fuel. The heating appliance may have a control valve for controlling the supply of air through the air inlet.

The heating appliance may include a flue exhaust for emissions to exit from the chamber. The flue exhaust may extend above the chamber and above the table top. The flue exhaust directs emissions or smoke away from people sitting around the table. A parasol may be supported by the flue exhaust. The parasol can disguise the flue exhaust. The parasol can trap heat from the heating appliance to enhance the warming effect of the heating appliance of the table.

The chamber may have an emitting mechanism for emitting combustible gas into the chamber. The heating appliance may include a catalytic converter for reducing emissions, such as carbon emissions, from the chamber.

The heating appliance may extend above the table top. At least part of the at least one window may be above the table top. The door may be above the table top.

Alternatively, at least one said window may be substantially coplanar with an upper surface of the table top. When the door is in a closed position closing the chamber opening, the door may be substantially coplanar with the upper surface of the table top.

There may be a gap between the heating appliance and the at least one wall of the recess. The gap may form an air gap or a heat insulation gap. This provides a barrier to protect, say, tableware on the table top from direct heat from combusting fuel in the heating appliance. The wall may have at least one aperture.

The air inlet may be configured to receive air via the at least one wall aperture.

The air inlet may comprise at least one entrance aperture, at least one exit aperture, and at least one conduit between the at least one entrance aperture and the at least one exit aperture, the at least one exit aperture being in an upper part of the chamber. The at least one conduit may be heated by heat generated by the combustible fuel in use. This causes air in at least one said conduit to rise.

The at least one exit aperture may be above at least one said window in a side of the heating appliance. The exit aperture may thus provide a flow of air past the window to prevent the accumulation of soot and smoke stains on the window. Also, air from the exit aperture may mix with flames from the combusting fuel igniting volatiles and unburnt carbons or smoke emitting from the combusting fuel thus providing cleaner combustion.

The chamber may have a lower part comprising a first heat conductive material and an upper part comprising a second heat conductive material, the first heat conductive material being more conductive than the second heat conductive material. The upper part may comprise the at least one window comprising the second heat conductive material.

The table may include a mechanism for raising or lowering the heating appliance relative to the table top.

The heating appliance may have a cooking surface in which heat generated by the combustible fuel in use cooks food with which the heating appliance is used which is placed on the cooking surface.

The heating appliance may be centrally positioned in the table top.

Embodiments of the present invention will now be described, by way of example, with reference to the accompanying schematic drawings, in which:

FIG. 1 is a perspective view of a table according to one embodiment of the invention;

FIGS. 2 and 3 are sectional view taken along lines 2-2 and 3-3, respectively, of FIG. 1;

FIGS. 4 and 5 are sectional view taken along lines 4-4 and 5-5, respectively, of FIGS. 2 and 3;

Figure 10:
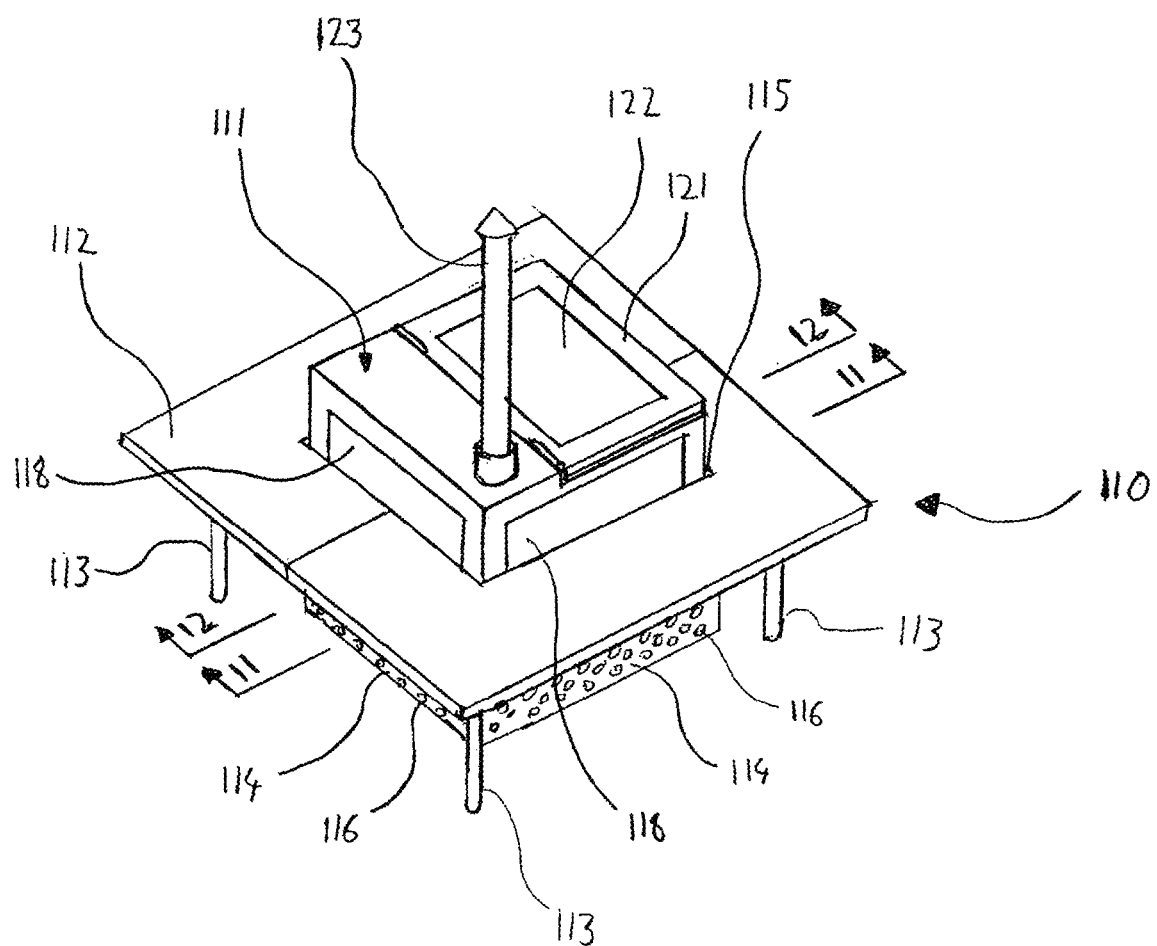
FIG. 10 is a perspective view of a table according to a further embodiment of the invention.
Figure 11:
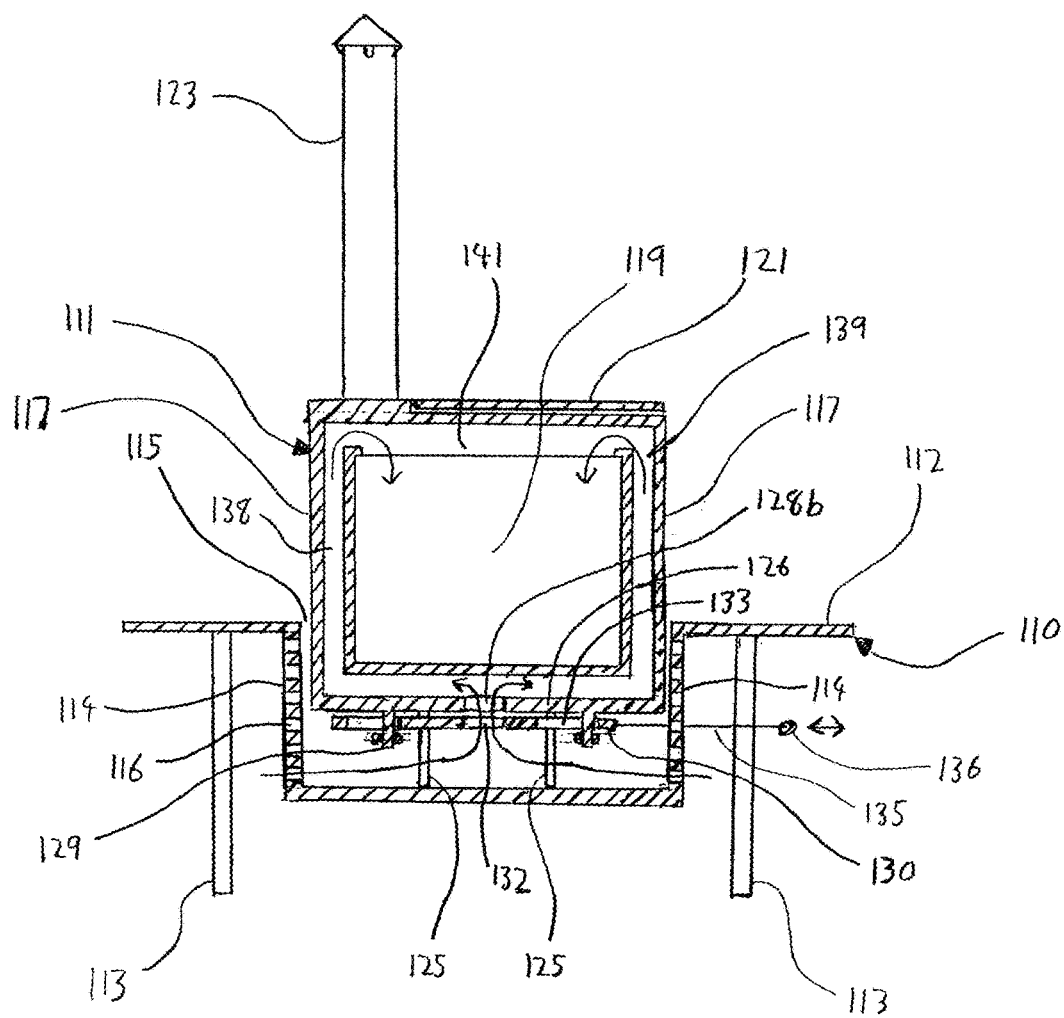
Figure 12:
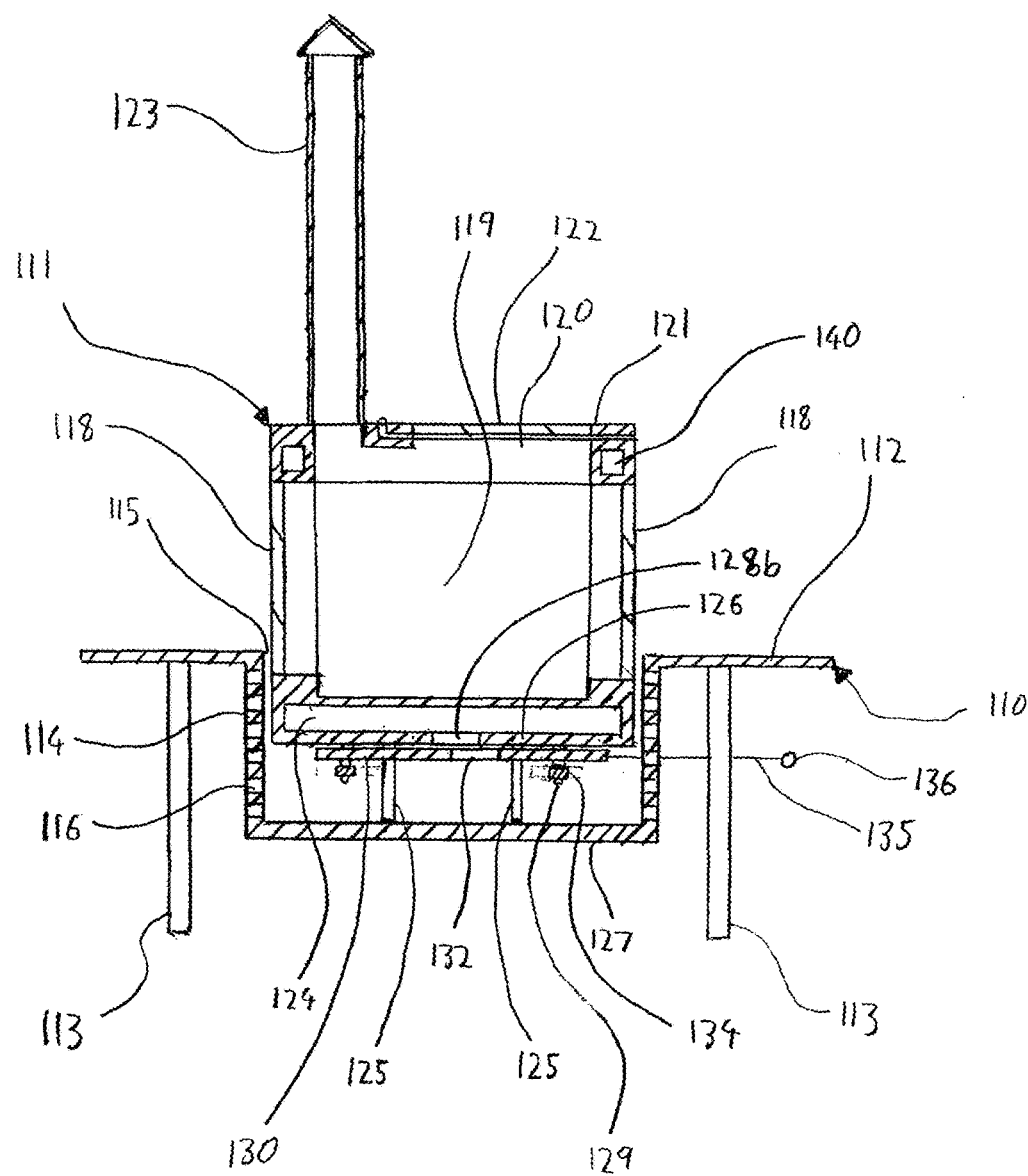
Figure 13:
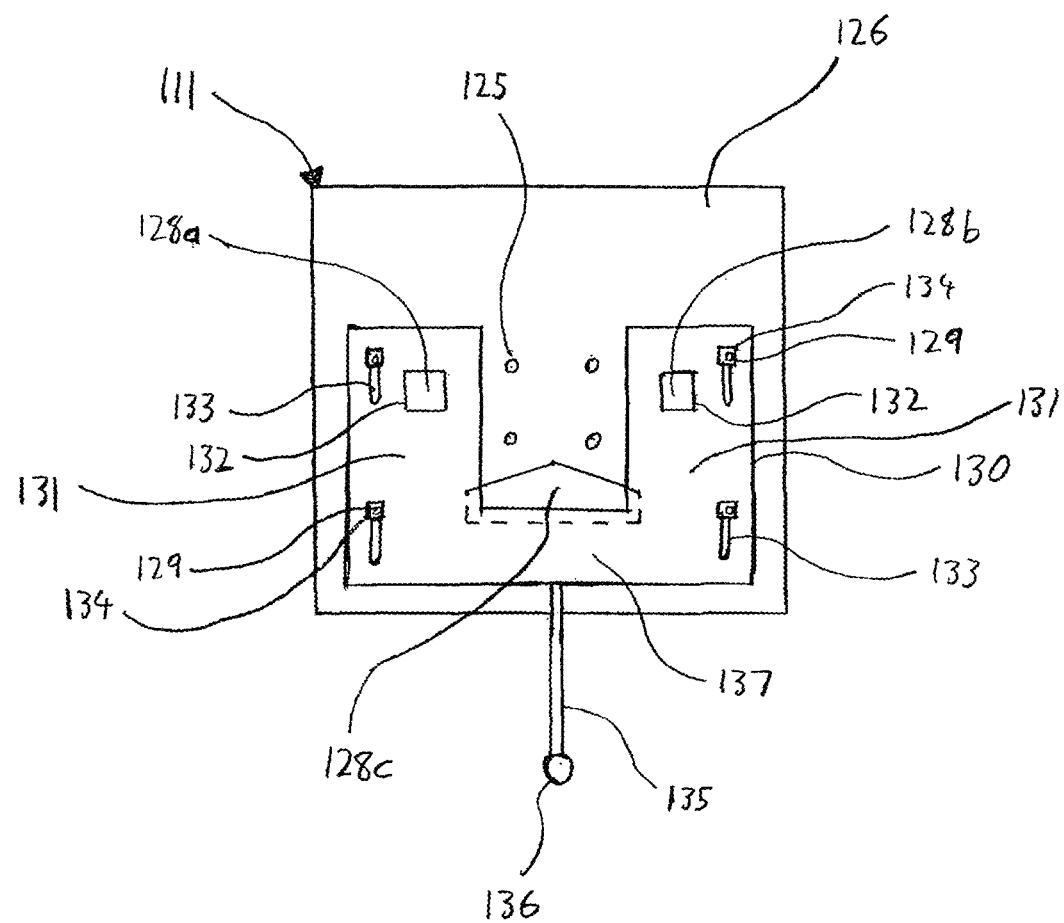
Figure 14:
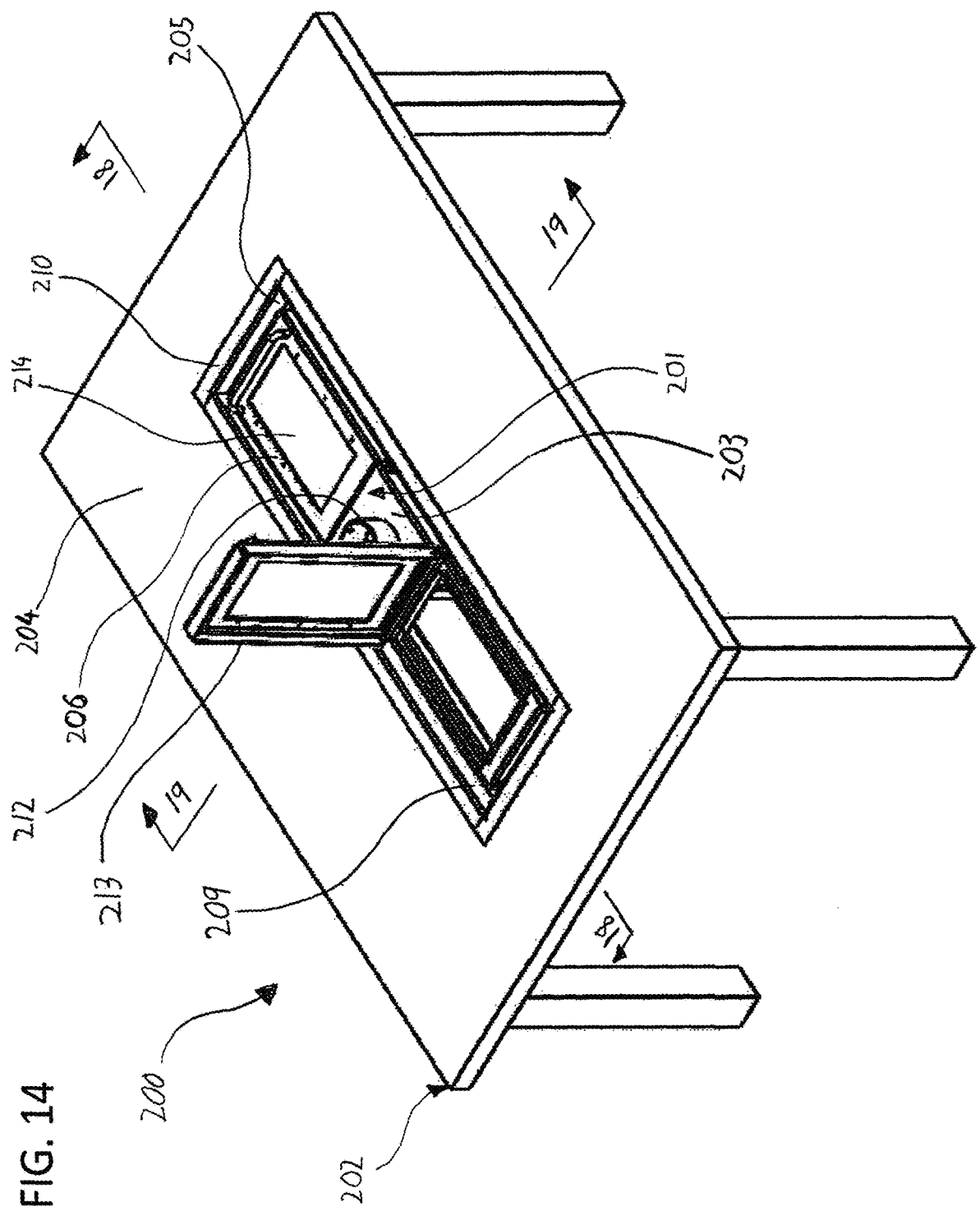
Figure 15:
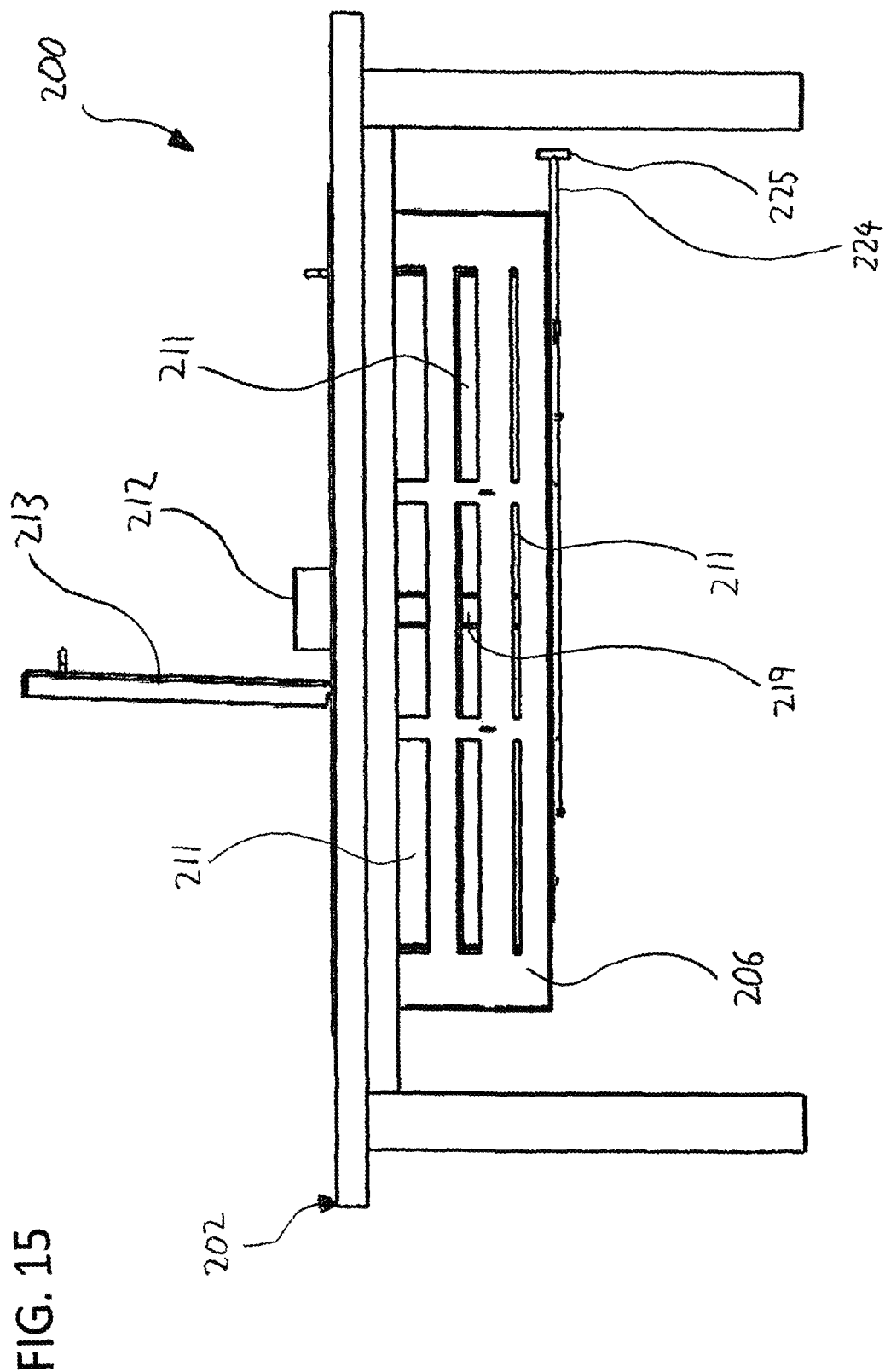
Figure 16:
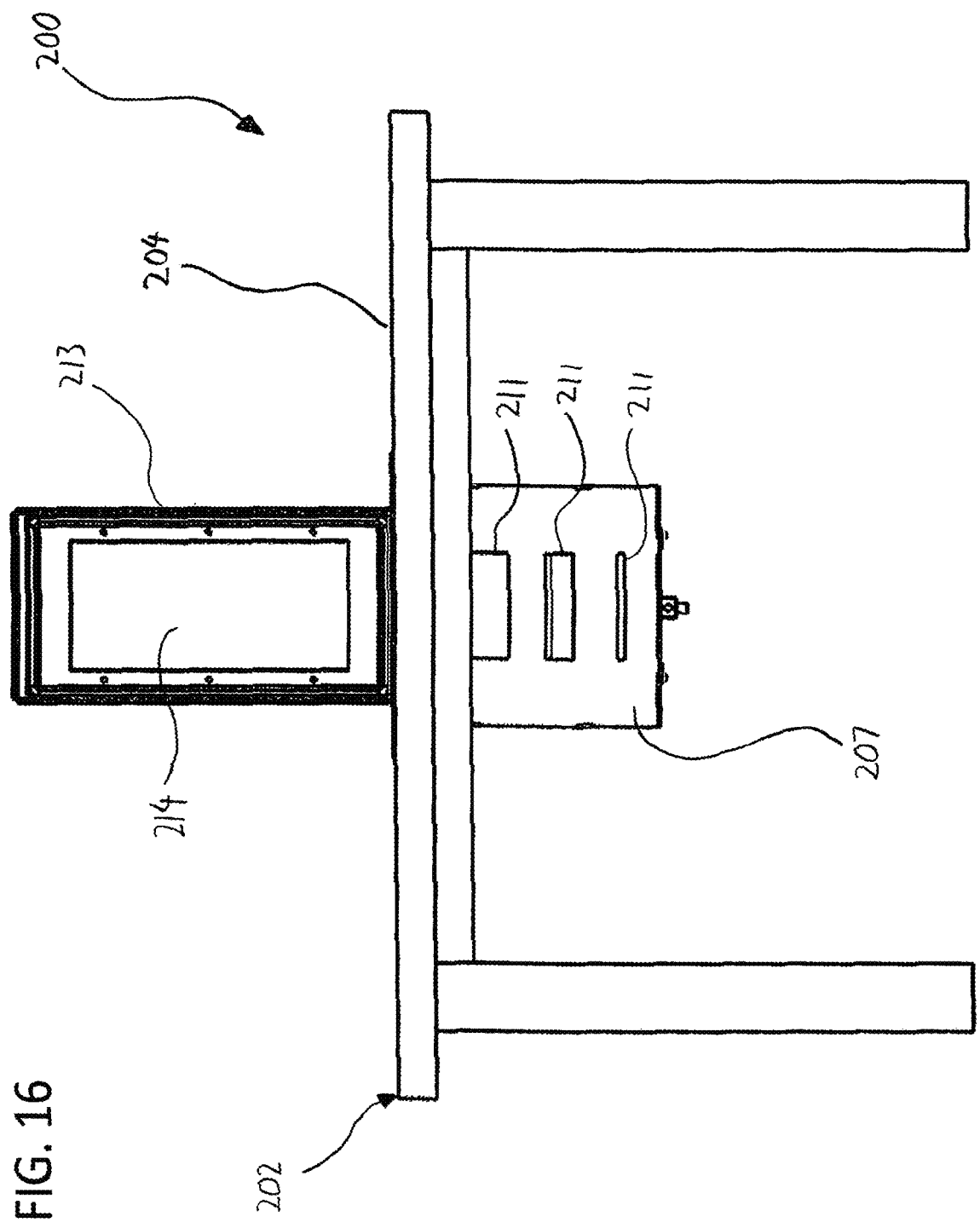
Figure 17:
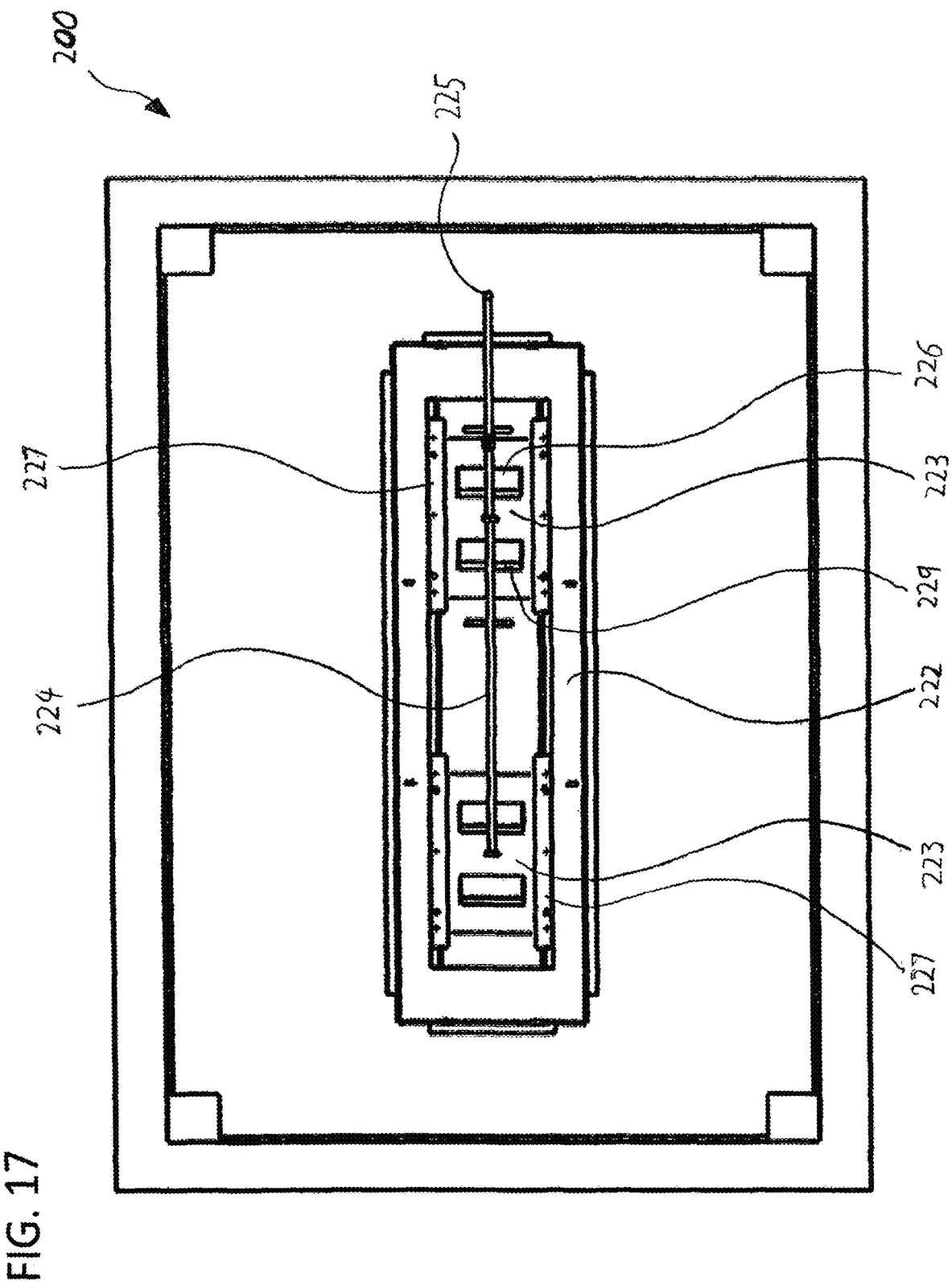

FIGS. 11 and 12 are sectional view taken along lines 11-11 and 12-12, respectively, of FIG. 10;

FIG. 13 is a view of the underside of a heating appliance of the table of FIGS. 10 to 12;

FIG. 14 is a perspective view of yet another modified table;

FIG. 15 is a side view of the table of FIG. 14;

FIG. 16 is an end view of the table of FIG. 14;

FIG. 17 is an underside view of the table of FIG. 14; and

Figure 18:
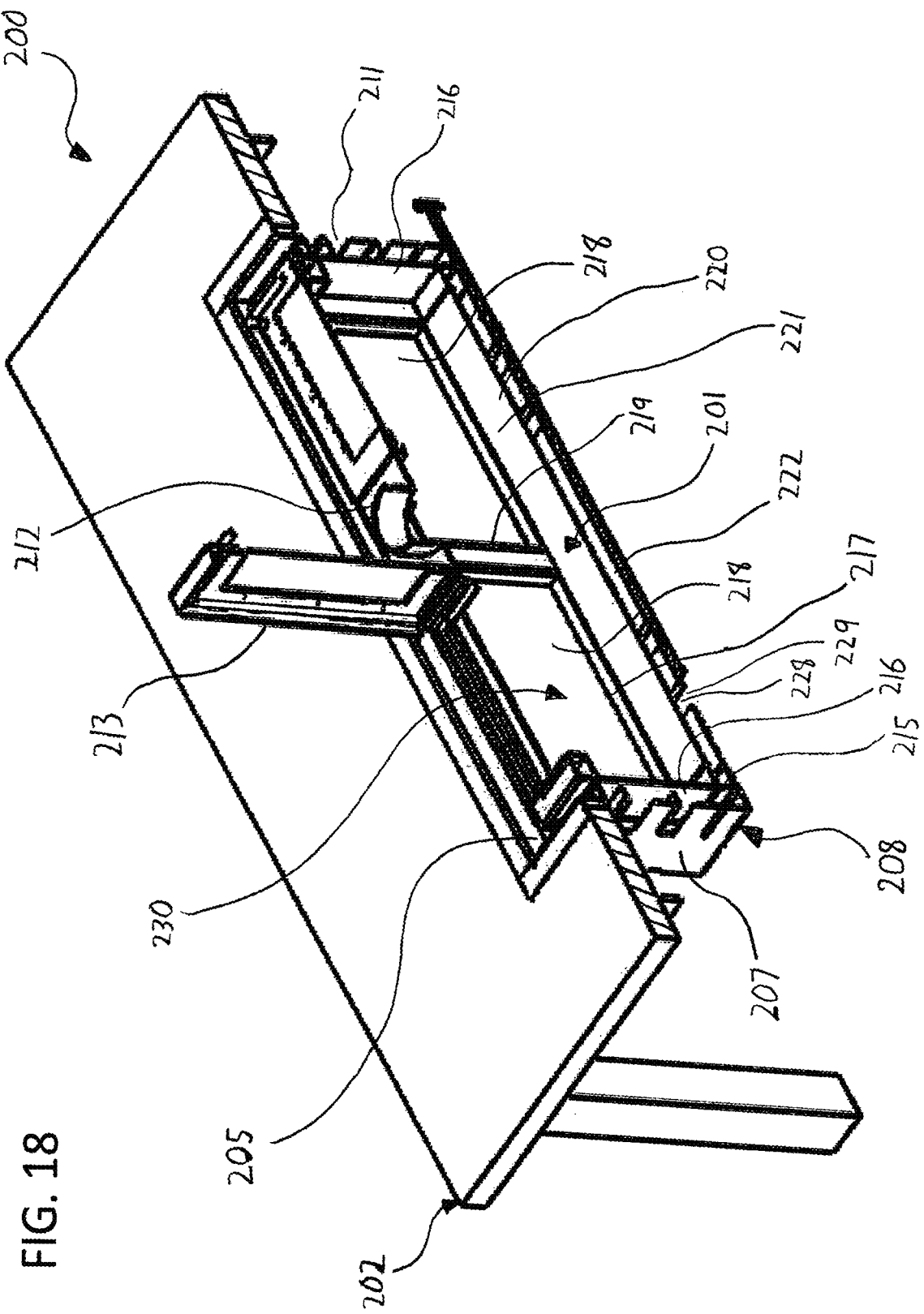
Figure 19:
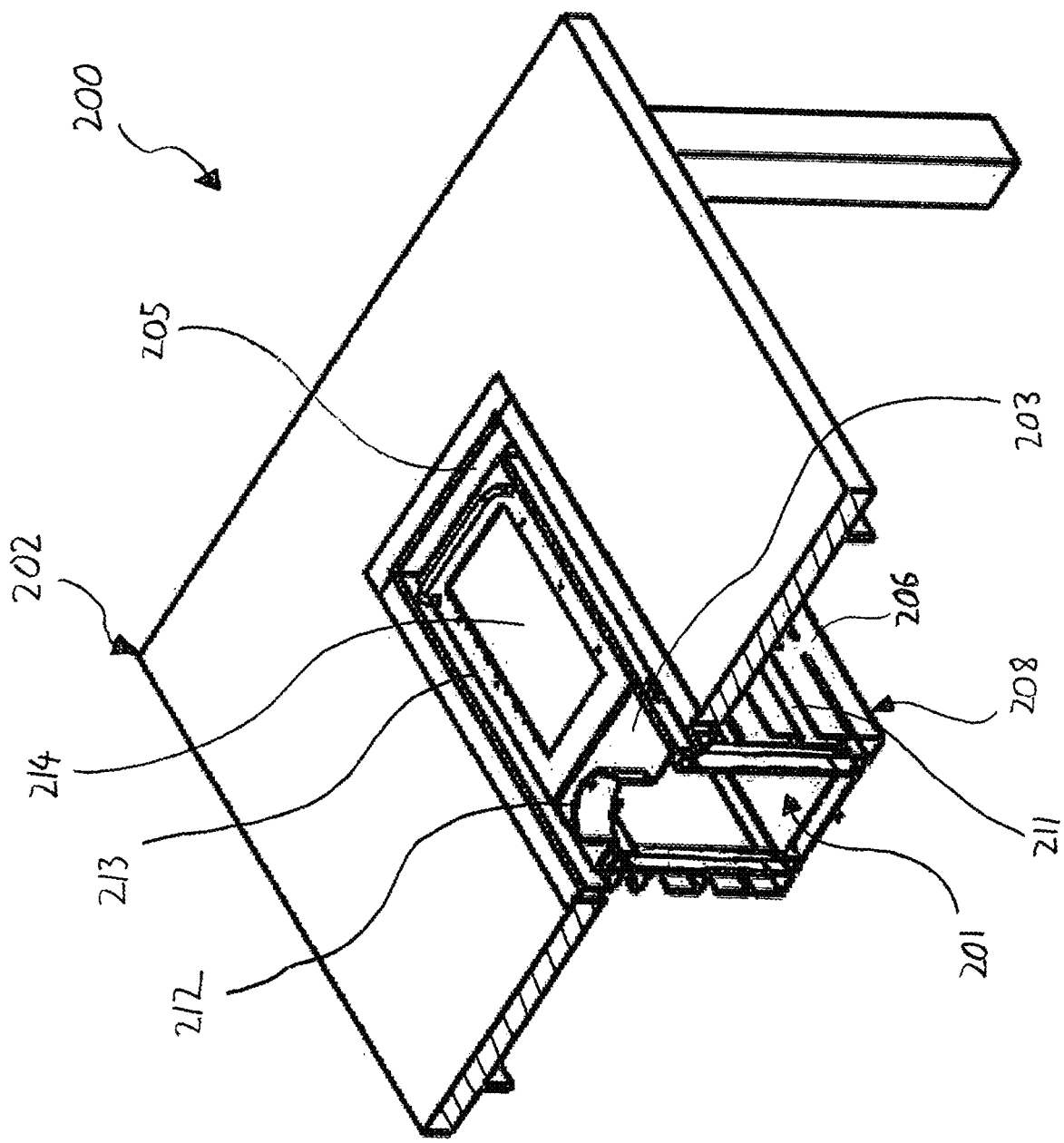

FIGS. 18 and 19 are isometric sectional views taken along lines 18-18 and 19-19, respectively, of FIG. 10.

Referring to FIGS. 1 to 5 of the accompanying drawings, a table 1 has a table top 2 containing an opening 3 centrally positioned therein, and two pairs of legs 4 to support the table top 2. The opening 3 forms a rectangular recess 5 extending beneath the table top 2. The recess 5 has two longitudinal side walls 6, two end walls 7 and a base 8, wherein the two longitudinal side walls 6 each have a plurality of apertures or perforations 9. The walls 6, 7 and base 8 of the recess 5 may comprise metal.

The recess 5 receives a heating appliance or stove 10, and mounted on the base 8 of the recess 5 is a scissors jack 11 for raising or lowering the heating appliance 10 relative to the table top 2 of the table 1. A handle 12 for operating the scissors jack 11 extends beyond the outside of one of the longitudinal side walls 6.

The heating appliance 10 comprises a cuboid shaped chamber 13 wherein the chamber 13 has a frame 14. The frame 14 has a base 15 and four legs 16 extend from beneath the frame base 15 to rest on the recess base 8 of the table 1 and the top of the scissors jack 11 is arranged to engage the underside of the frame base 15. When the scissors jack 11 is used to raise the heating appliance 10, the legs 16 are lifted off the recess base 8 and the scissors jack 11 can be used to lower the heating appliance 10 until the legs 16 engage the recess base 8. The frame base 15 supports a bed of loose ceramic fire bricks 17.

The chamber frame 14 comprises a lower rectangular annular conduit 18 on top of the frame base 15 and extending around the perimeter of the frame base 15 wherein the lower rectangular annular conduit 18 has two longitudinal side conduit portions 19 and two end conduit portions 20. The chamber frame 14 also has an upper rectangular annular conduit 21 wherein the upper rectangular annular conduit 21 has two longitudinal side conduit portions 22 and two end conduit portions 23. Each corner of the upper rectangular annular conduit 21 is connected to the corresponding corner of the lower rectangular annular conduit 18 by a conduit column 24. There are also three equally spaced columns 25 between the conduit columns 24 at opposite ends of the lower and upper longitudinal side conduit portions 19, 22.

On the underside of each upper end conduit portion 23 is a slot 26. On the underside of each upper longitudinal side conduit portion 22 is a series of slots 27 wherein each slot 27 is either between adjacent columns 25 or between a column conduit 24 and an adjacent column 25. These slots 26, 27 form exit slots or apertures. On the underside of each lower longitudinal side conduit portion 19 is a series of slots or entrance slots or apertures 28. At either end of the series of entrance slots 28 is a pin 29 which extends downwards from the underside of the chamber frame base 15. A shaft 30 extends through the central column 25a of the three equally spaced columns 25 from the top of the chamber frame 14 to the base 15 and a top end portion 31 of the shaft 30 is threaded. A nut 32 is screwed on to the threaded top end shaft portion 31 and prevents the shaft 30 from falling through the central column 25a. The lower end of shaft 30 is fixed to a control bar 33 which has an aperture 34 at either end wherein each aperture 34 receives a respective one of the pins 29. The control bar 33 is thus aligned with the series of entrance slots 28 on the underside of the lower longitudinal side conduit portion 19.

Each end of the heating appliance 10 has a pane of heat reflective glass 35 bounded by the lower and upper end conduit portions 20, 23 and the column conduits 24. Each side of the heating appliance 10 has a pane of heat reflective glass 36 bounded by the lower and upper longitudinal side conduit portions 19, 22 and by adjacent columns 25 or by a column conduit 24 and an adjacent column 25.

The heating appliance 10 extends above the table top 2 of the table 1 and there is an air gap 37 between the part of the heating appliance 10 below an upper planar or flat surface of the table top 2 and the walls 6, 7 of the recess 8.

The top of the chamber frame 14 supports a central flue exhaust 38 extending from a flue base 39 that spans between longitudinal sides 40 of the frame 14. A hot plate or cooking plate 41 is supported by the frame 14 to either side of the flue base 39. An opening 42 into the chamber 13 is bounded by the longitudinal sides of the chamber frame 14, and between each hot plate 41 and the adjacent upper end conduit portion 23. The opening 42 is closed by a door 43 comprising a door frame 44 having a pane of heat reflective glass 45, and each door 43 is arranged to open about a hinged connection 46 adjacent a respective hot plate 41. An upper part 48 of the chamber 13 contains the windows 35, 36, 45 and a lower part 49 of the chamber 13 is beneath the windows 35, 36. The lower part 49 of the chamber 13 more readily conducts heat than the windows 35, 36, 45.

In a specific example of a preferred embodiment, the heat reflective glass 35, 36, 45 may be Robax® glass. The walls 6, 7 of the recess 5 may comprise steel which may be 1.5 mm thick. The thickness of the air gap 37 between the part of the heating appliance 10 below the upper surface of the table top 2 and the walls 6, 7 of the recess 5 may be between 20 and 80 mm. A heat shield may also be included in or adjacent the air gap 37. Each hot plate 41 may be a steel plate.

When the heating appliance 10 of the table 1 is to be used, the doors 43 are opened and combustible fuel 47, such as logs of wood or charcoal, is placed in the chamber 13 on the bed of fire bricks 17. The combustible fuel 47 is lit and the doors 43 are closed to substantially seal the chamber 13. A flow of air passes through the apertures 9 in the longitudinal side walls 6 of the recess 5, and the conduits 18, 21, 24 of chamber frame 14 wherein the air enters the frame 14 via the entrance slots 28 in the lower longitudinal side conduits 19 and leaves the frame 14 via the exit slots 26, 27 in the upper longitudinal side conduits 22 to enable the combustible fuel in the chamber 13 to burn or combust. The slots 26, 27, 28 and the conduits 18, 21, 24 of the chamber frame 14 form an air inlet, and the air in the conduits 18, 21, 24 is heated by heat generated by the combusting fuel.

The exit slots 26, 27 are above windows 35, 36 in the sides of the chamber 13, and they provide a flow of air past the windows 35, 36 to prevent the accumulation of soot and smoke stains on the windows 35, 36. Also, by the air in the conduits 18, 21, 24 being heated and heat being reflected by the glass windows 35, 36, 45, the temperature in the chamber 13 can be raised to about 300° C. which would burn any soot off the glass. In addition, air from the exit slots 26, 27 mix with flames from the combusting fuel igniting volatiles and unburnt carbons or smoke emitting from the combusting fuel to provide cleaner combustion and products of combustion exit the chamber 13 via the flue exhaust 38.

The windows 35, 36, 45 allow an attractive view of flames from combusting fuel to be seen. The flames may also be seen through the parts of the windows 35, 36 below the table top 2 via the apertures 9 in the side longitudinal walls 6 of the recess 5. Heat generated by the combusting fuel is mainly radiated under the table top 2 of the table 1 to warm people sitting around the table 1 via the part of the heating appliance 10 beneath the heat reflecting windows 35, 36 and beneath the table top 2 with the table top 2 trapping radiated heat beneath it. Some heat though is transmitted through the heat reflective glass 35, 36, 45 and can provide some warmth above the table top 2. The air gap 37 between the heating appliance 10 and the walls 6, 7 of the recess 5 provide some insulation from the heat generated. By using the handle 12 to operate the scissors jack 11 to raise or lower the heating appliance 10 relative to the table top 2, the heat radiated under the table top 2 of the table 1 can be decreased or increased, respectively. This also causes more or less of the windows 35, 36 in the sides of the heating appliance 10 to be shown above the table top 2 so that the visual impact of the flames can be increased or decreased.

The amount of heat radiated can also be controlled by rotating the nuts 32 to raise the control bars 33 towards the entrance slots 28 or lower the control bars 33 away from the entrance slots 28 so that the control bar 33 acts as a valve to control the supply of air to the chamber 13.

Heat generated by the combusting fuel in the chamber 13 also heats the hot plates 41 and food can be placed on them to be cooked.

Figure 1:
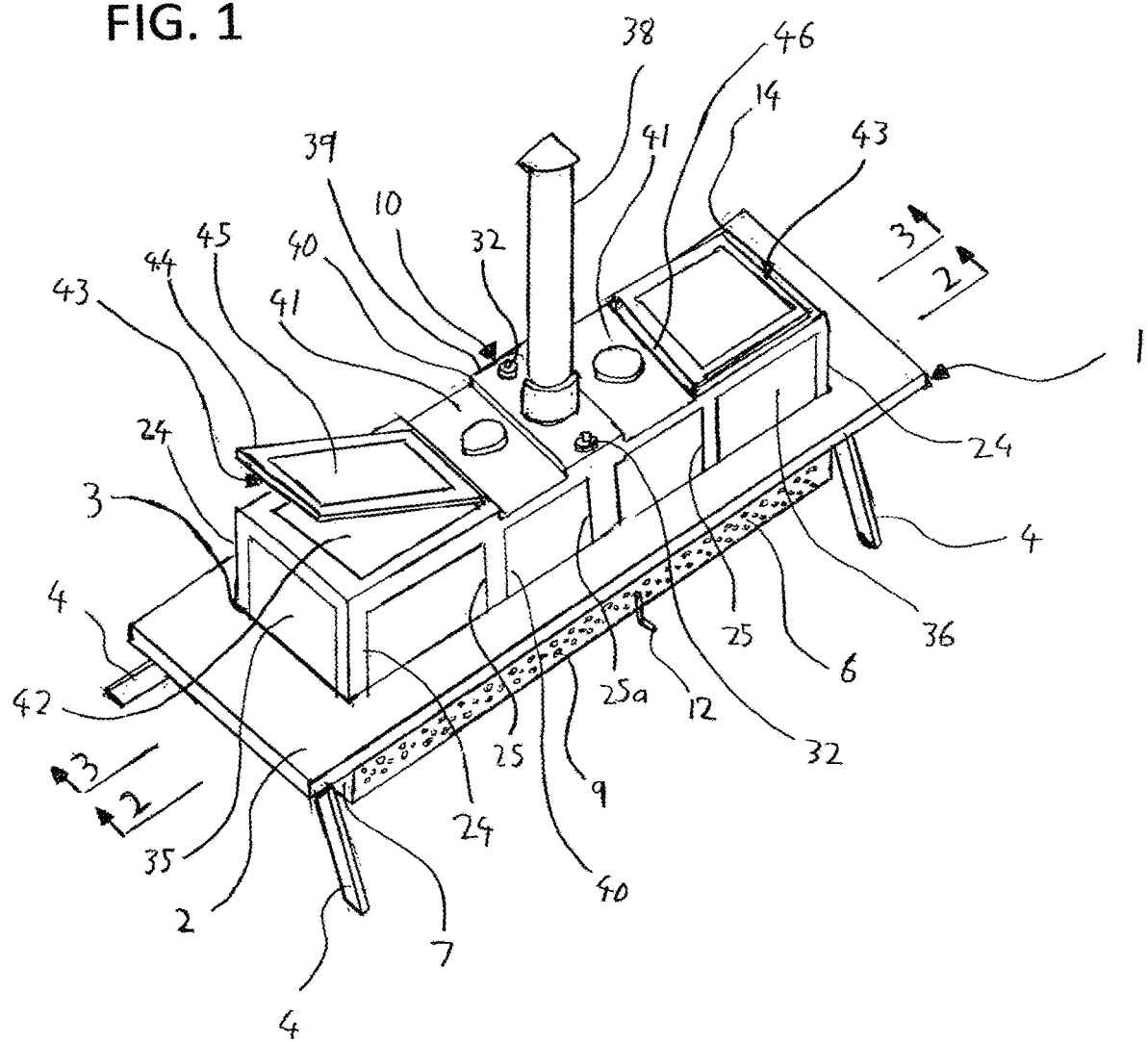
Figure 2:
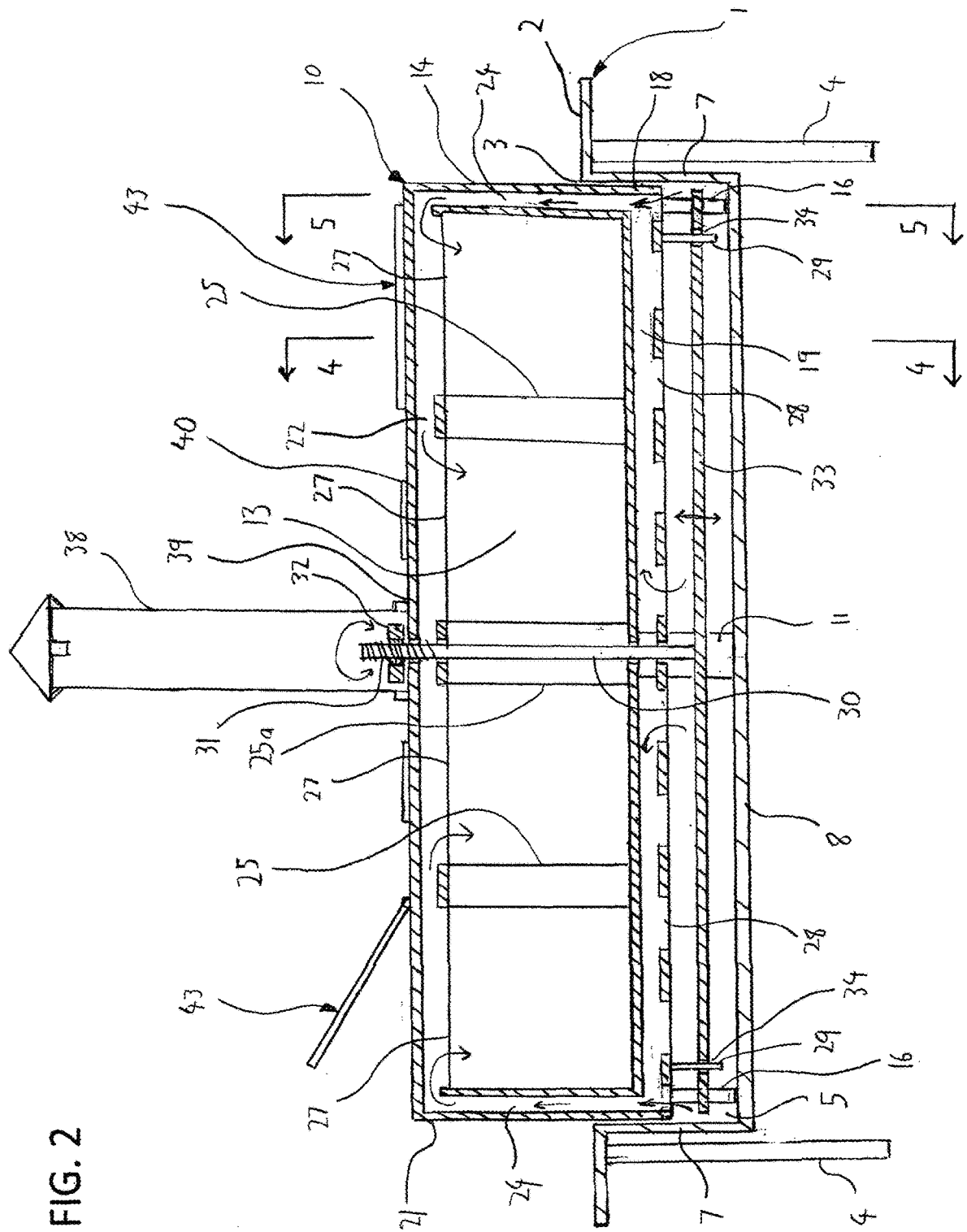
Figure 3:
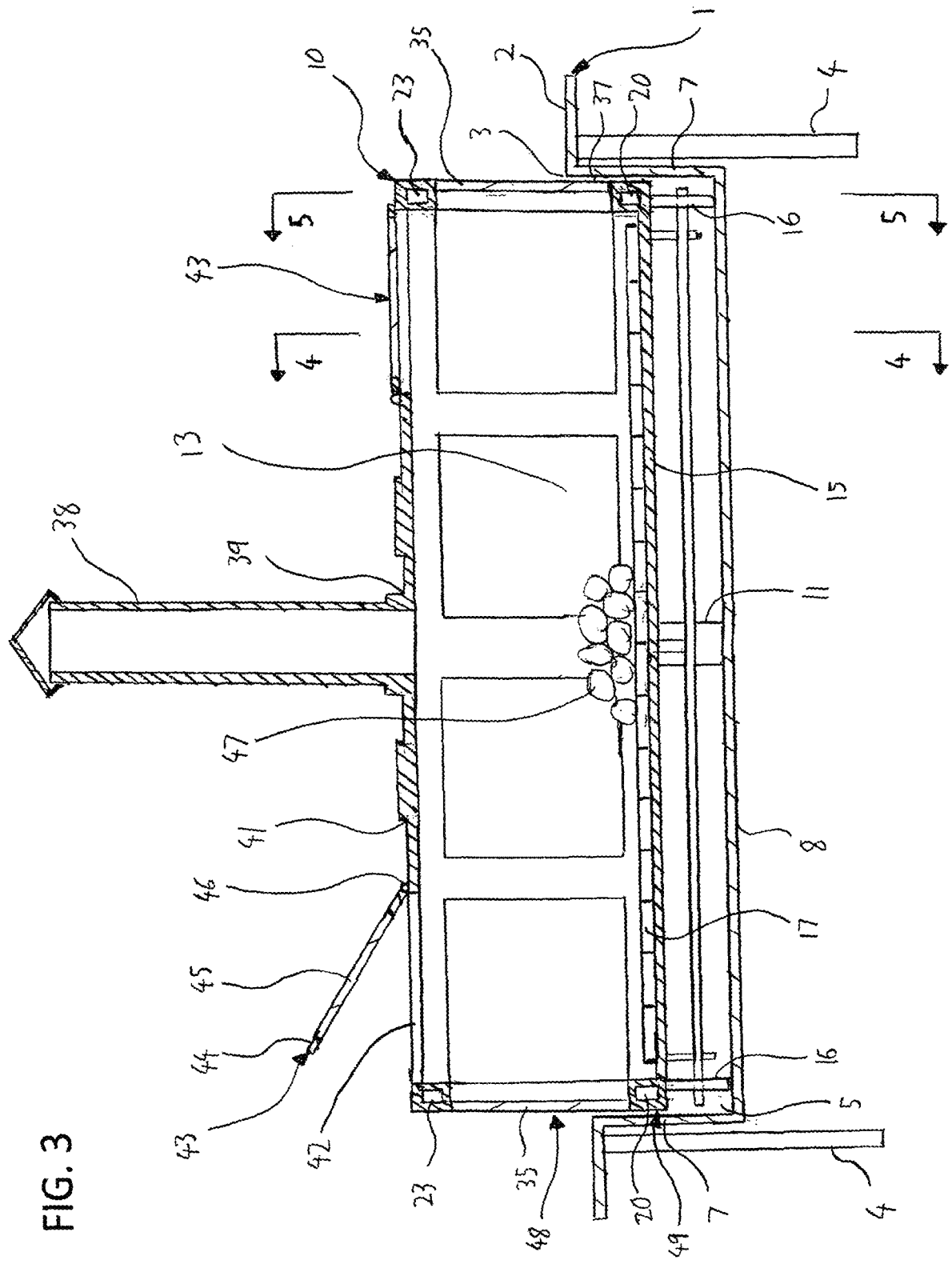
Figure 4:
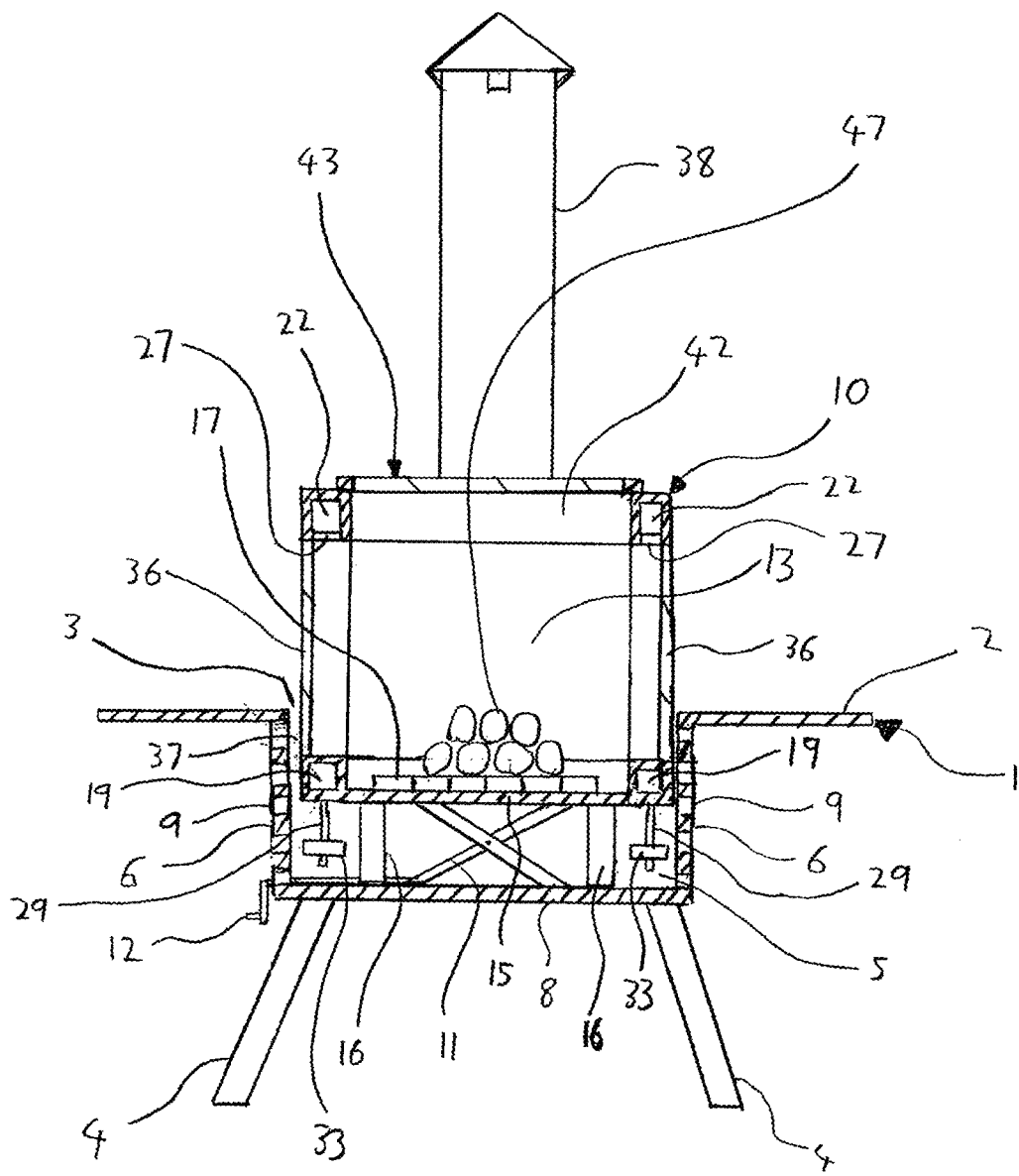
Figure 5:
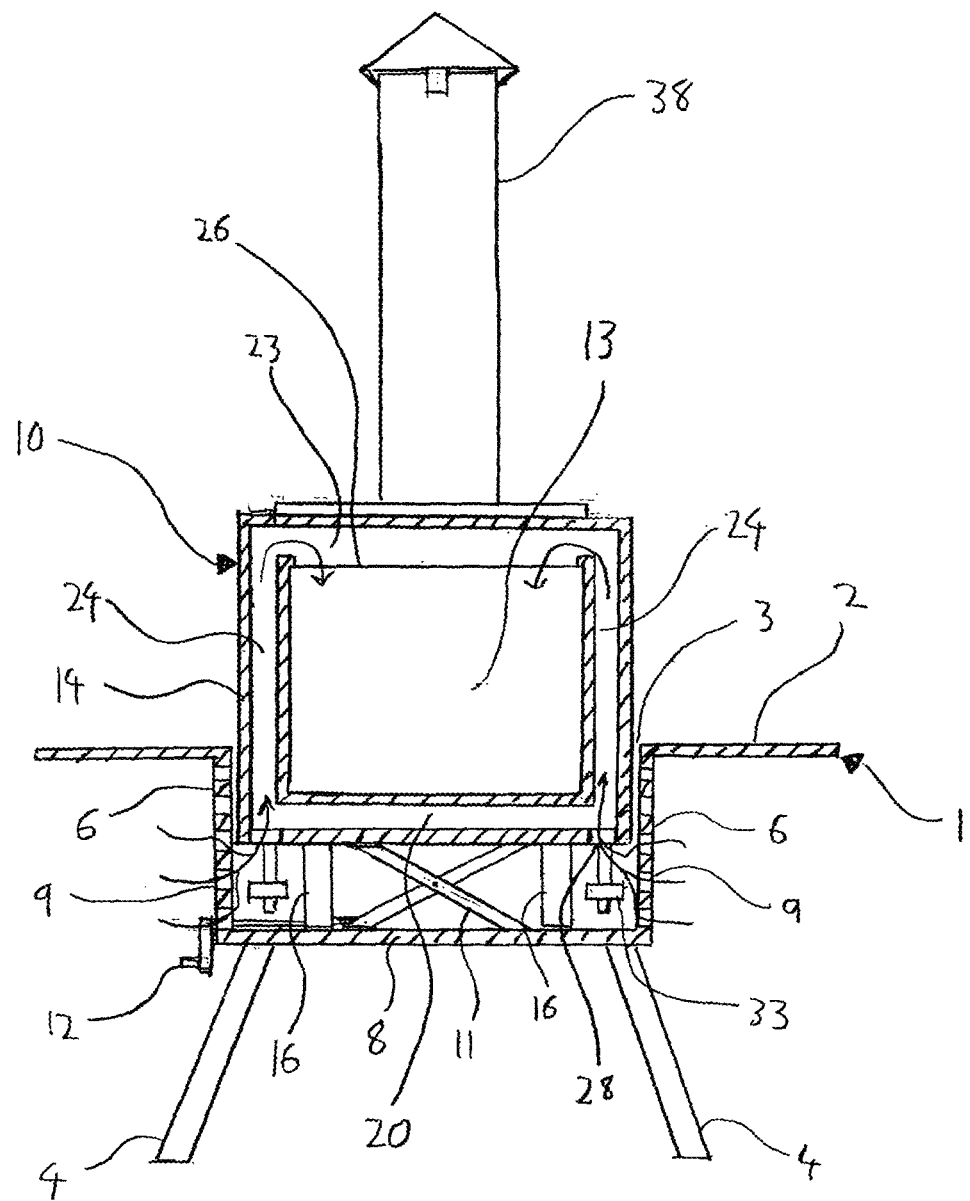
Figure 6:
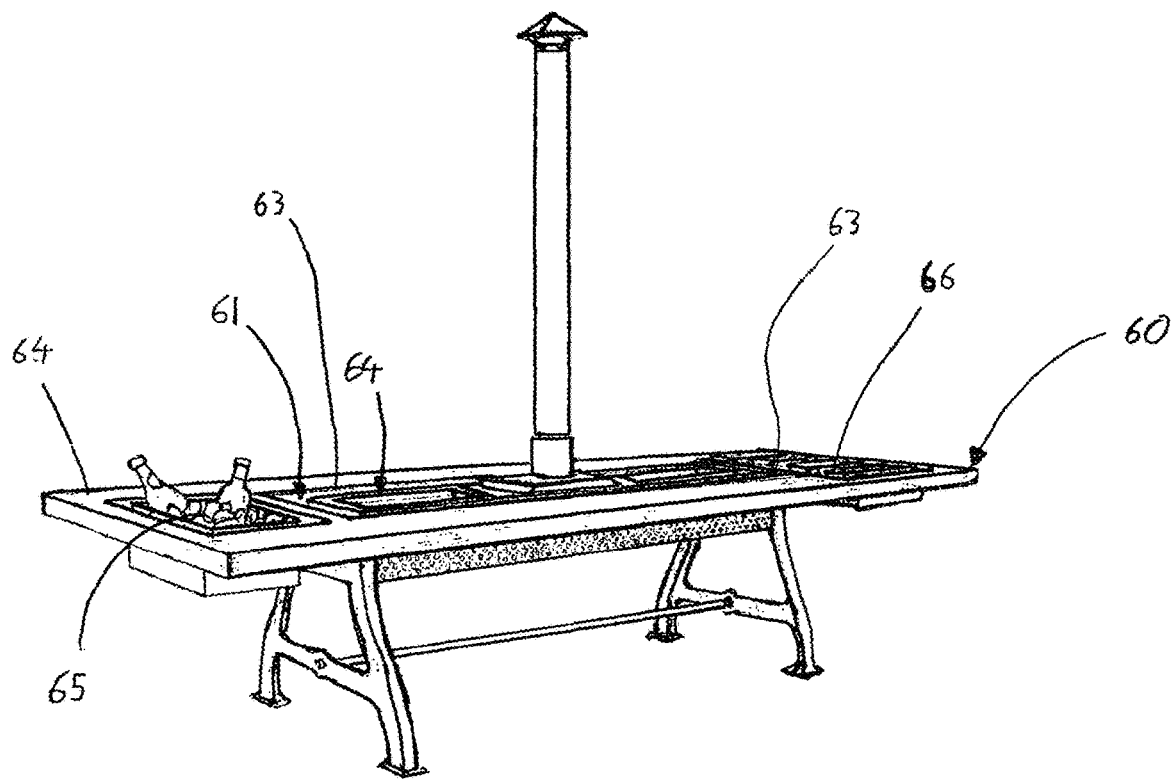
FIG. 6 is a perspective view of a modified table.

A modified table 60 with a heating appliance 61 is illustrated in FIG. 6 wherein the heating appliance 61 has been fully lowered into the recess 62 so that the top of the chamber frame 63 of the heating appliance 61 is flush with an upper surface of the table top 64. The heating appliance 61 though does not have hot plates. The table top 64 has a cavity 65 at one end for holding bottles and another cavity 66 at the opposite end.

Figure 7:
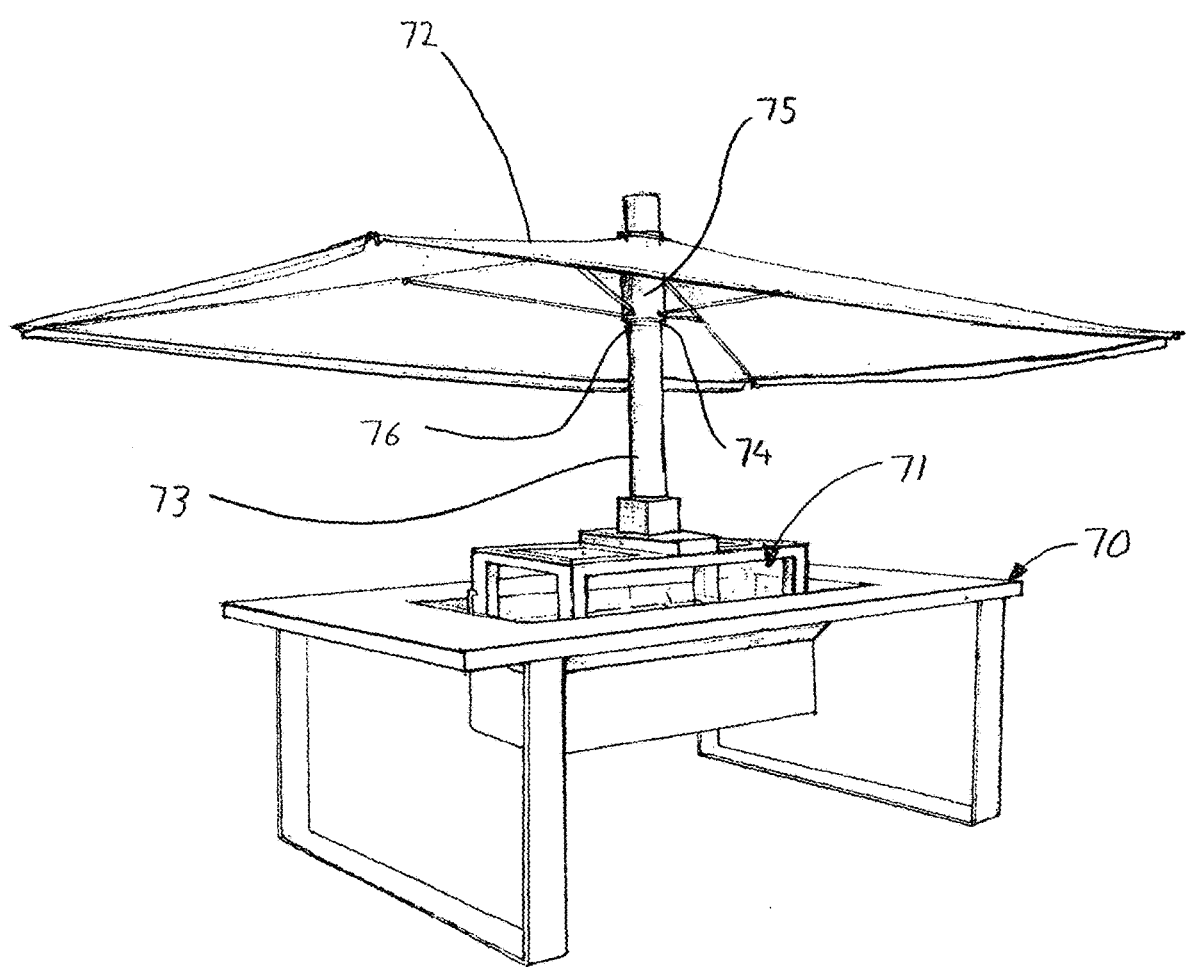
FIG. 7 is a perspective view of another modified table.

Another modified table 70 with a heating appliance 71 is illustrated in FIG. 7 wherein a parasol 72 is supported by the flue exhaust 73. In the vicinity of the parasol 72, the outside of the flue exhaust 73 has heat insulation material 74, and the portion of the parasol 72 adjacent the flue exhaust 73 also has heat insulation material 75 to protect the parasol 72 when the flue exhaust 73 is in use. The flue exhaust 73 has an annular flange 76 which supports the parasol 72.

Figure 8:
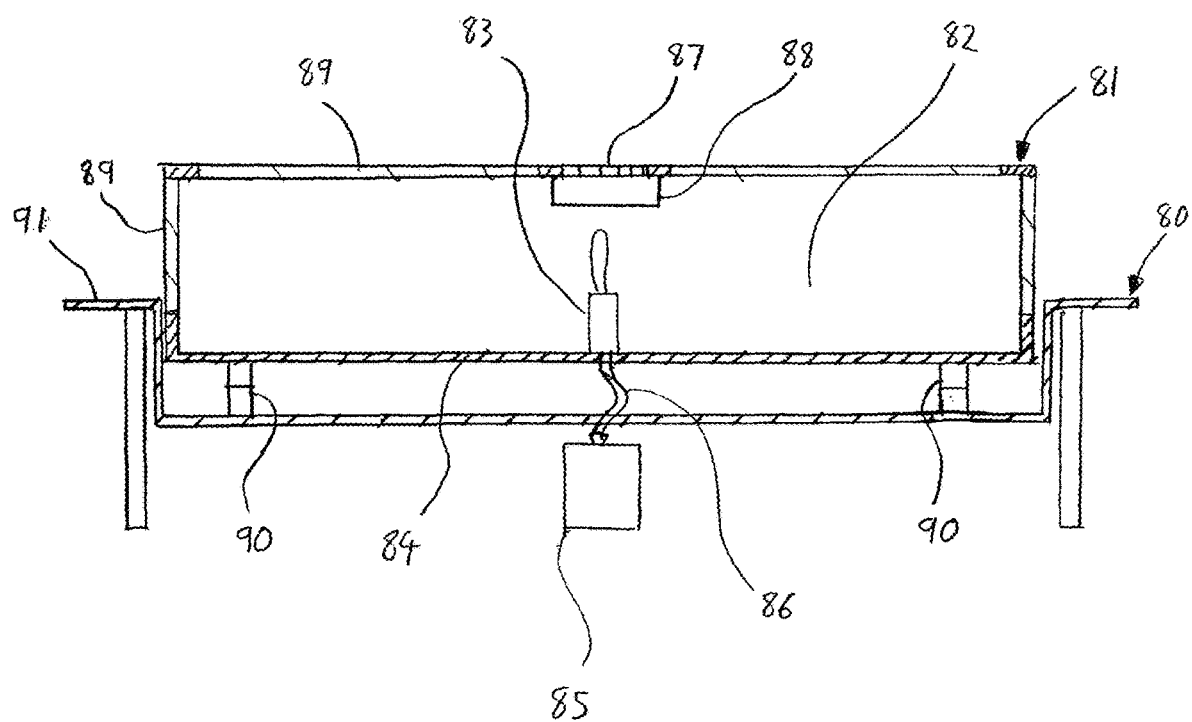
FIG. 8 is a sectional view similar to FIG. 3 of yet another modified table.

Another modified table 80 with a heating appliance 81 is illustrated in FIG. 8 wherein the chamber 82 of the heating appliance 81 no longer has a bed of fire bricks for receiving combustible fuel but instead has a burner or emitter 83 mounted on the chamber base 84 for emitting combustible fuel in the form of gas. The gas burner 83 is connected to a gas canister 85 beneath the table 80 via a hose 86. Controls (not shown) are provided to control the amount of gas emitted by the burner 83 and to ignite the gas. The top of the chamber 82 has an exhaust vent 87 wherein emissions enter the exhaust vent 87 via a catalytic converter 88. The chamber 82 has heat reflective windows 89 in its side and in its top but it does not have frame conduits. The table 80 has a pair of scissor jacks 90 to raise or lower the heating appliance 81 relative to the table top 91.

Figure 9:
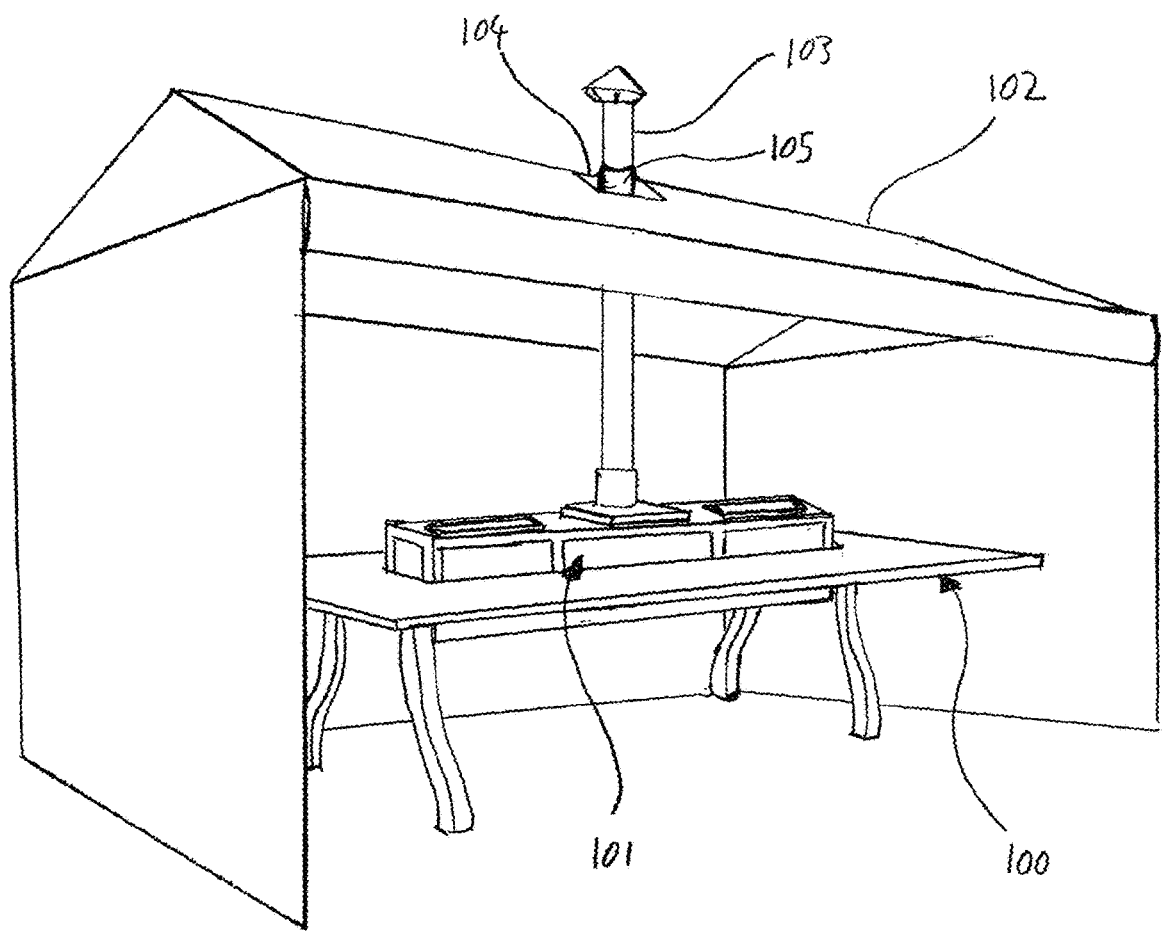
FIG. 9 is a view of a table according to an embodiment of the invention in a tent.

Referring to FIG. 9, a table 100 with a heating appliance 101 is shown located in a tent 102 wherein the flue exhaust 103 extends through an opening 104 in the tent 102. The outside 105 of the flue exhaust 103 in the vicinity of the tent 102 has heat insulation material to protect the tent 102 when the flue exhaust 103 is in use.

Another modified table 110 with a heating appliance 111 is illustrated in FIGS. 10 to 13. The table top 112 can be folded in half for transportation, and has legs 113 for supporting the table top 112 which are removable. The table top 112 and heating appliance 111 are substantially square in plan. The four side walls 114 of the table recess 115 all have a plurality of apertures 116.

The heating appliance 111 has four side walls 117 wherein each side wall 117 contains a single pane of heat reflective glass 118. The chamber 119 of the heating appliance 111 for containing combustible fuel has a single opening 120 closed by a door 121. The pane of glass 122 in the door 121 may be replaced by a hot plate. The flue exhaust 123 is adjacent one corner of an upper surface of the chamber 119.

Beneath the combusting or main chamber 119 is a plenum chamber 124 and four supporting legs 125 extend from the base 126 of the plenum chamber 124 to rest on the base 127 of the recess 115 of the table 110. The plenum chamber base 126 has three air inlet entrance apertures 128a, 128b, 128c spaced around the supporting legs 125 and two pairs of threaded pins 129. A U-shaped plate 130 is positioned underneath the plenum chamber base 126 and around the supporting legs 125, and each leg 131 of the plate 130 has an aperture 132. The U-shaped plate 130 has two pairs of slots 133 wherein each slot 133 receives a respective one of the pins 129 and each pin 129 has a nut 134 screwed onto it on which the plate 130 rests. The U-shaped plate 130 has a shaft 135 attached to it which extends through one of the side walls 114 of the table recess 115 and has a handle 136 at a distal end. The handle 136 enables the plate 130 to be slid relative to the plenum chamber base 126 so that the plate 130 forms a control valve for the air inlet entrance apertures 128a, 128b, 128c. When the valve is fully opened, each leg aperture 132 of the U-shaped plate 130 is aligned with one of the first two air inlet entrance apertures 128a, 128b, and the portion 137 of the U-shaped plate 130 connecting the legs 131 of the plate 130 is to one side of a third one of the air inlet entrance apertures 128c.

The plenum chamber 124 is connected to the four conduit columns 138 of the chamber frame 139 wherein the conduit columns 138 are connected to the upper annular conduit 140.

In use, air passes through the apertures 116 in the recess side walls 114 and enters the chamber frame 139 via the air inlet entrance apertures 128a, 128b, 128c of the plenum chamber 124 and leaves the frame 139 by exit slots 141 in the underside of the upper annular conduit 140 to enable combustible fuel in the main chamber 119 to combust or burn.

The amount of heat radiated from fuel combusting in the chamber 119 can be controlled by using the handle 136 to slide the U-shaped plate 130. If the air inlets 128a, 128b, 128c are to be closed then handle 136 is pushed in as far it can go causing the legs 131 of the plate 130 to cover the first two air inlet entrance apertures 128a, 128b and the portion 137 connecting the legs 131 to cover the third air inlet entrance aperture 128c.

The table 110 illustrated in FIGS. 10 to 13 does not have scissors jacks but these could easily be included.

A modification of the table 110 and heating appliance 111 illustrated in FIGS. 10 to 13 is shown in FIGS. 14 to 19, and the flue exhaust has been omitted for clarity.

The table top 202 of the modified table 200 and the heating appliance 201 are substantially rectangular in plan. A top surface 203 of the heating appliance 201 is flush with an upper surface 204 of the table top 202. There is an air gap 205 between the heating appliance 201 and the walls 206, 207 of the table recess 208. The walls 206, 207 of the table recess 208 extend downwardly through a central opening 209 in the table top 202 from an annular flange 210 that extends outwardly to sit on the upper surface 204 of the table top 202. The walls 206, 207 of the table recess 208 have slots or apertures 211.

A flue base 212 is centrally positioned in the top surface 203 of the heating appliance 201 between a pair of doors 213 wherein each door 213 has a pane of glass 214. Each end 215 of the heating appliance 201 has a single pane of glass 216 and each side 217 of the heating appliance 201 has a pair of panes of glass 218 separated by a central conduit column 219. The base 220 of the plenum chamber 221 of the heating appliance 201 sits on the base 222 of the table recess 208.

A pair of rectangular plates 223 connected by a central shaft 224 is positioned under the table recess base 222 and the shaft 224 extends beyond the plates 223 at one end and has a handle 225 at that end. The plates 223 have apertures 226 and are held by L-shaped members 227 extending from the underside of the table recess base 222. The handle 225 enables the plates 223 to be slid relative to the table recess base 222 so that the apertures 226 in the plates 223 enable the plates 223 to form a control valve for air inlet entrance apertures 228 in the plenum chamber base 220 which are aligned with apertures 229 in the table recess base 222.

In use, flames from combusting fuel in the main chamber 230 of the heating appliance 201 may be seen through the door panes 214. The flames may also be seen through the end panes 216 and side panes 218 via the slots 211 in the walls 206, 207 of the table recess 208.

Whilst particular embodiments have been described, it will be understood that various modifications may be made without departing from the scope of the claimed invention. The legs of the table may have adjustable feet for levelling. Instead of a scissor jack, any other suitable mechanism may be used to raise or lower the heating appliance relative to the table top.

The invention claimed is:

1. An apparatus comprising:
a tabletop comprising an opening;
a heating appliance disposed within the opening, the heating appliance comprising a chamber for receiving and combusting combustible fuel, the chamber comprising one or more conduits for receiving air within the chamber; and
a mechanism for raising or lowering the heating appliance through the opening relative to said tabletop.

2. The apparatus of claim 1, wherein the mechanism for raising or lowering the heating appliance comprises a scissors jack.

3. The apparatus of claim 2, wherein the scissors jack comprises a handle disposed beneath said tabletop.

4. The apparatus of claim 1, wherein the opening of the tabletop comprises at least two side walls and a floor that supports the heating appliance below said tabletop.

5. The apparatus of claim 4, wherein the side walls comprise apertures through which heat is radiated under the tabletop during operation of the heating appliance.

6. The apparatus of claim 5, wherein, the mechanism for raising or lowering the heating appliance causes heat radiated under the tabletop to decrease or increase as the heating appliance is raised or lowered, respectively, through the opening.

7. The apparatus of claim 4, wherein the mechanism for raising or lowering the heating appliance comprises a jack disposed between the heating appliance and the floor of the opening.

8. The apparatus of claim 1, wherein the one or more conduits are substantially vertical conduits that are defined between a wall of the chamber and an interior wall of the heating appliance.

9. The apparatus of claim 1, wherein the heating appliance comprises at least one window for viewing the combustion of combustible fuel inside the chamber.

10. The apparatus of claim 1, wherein the heating appliance further comprises a door for accessing the chamber, wherein the door comprises a transparent window.

11. The apparatus of claim 10, wherein the door is located above the tabletop.

12. The apparatus of claim 1, wherein the chamber of the heating appliance comprises a bottom and at least four walls.

13. The apparatus of claim 12, wherein air is provided into the chamber to combust the combustible fuel over a top surface of at least one of the walls.

14. The apparatus of claim 1, wherein the tabletop comprises at least four legs.

* * * * *